(12) United States Patent
Hochfield et al.

(10) Patent No.: US 7,617,528 B2
(45) Date of Patent: Nov. 10, 2009

(54) SMARTCARD WITH PROTECTED MEMORY ACCESS

(75) Inventors: Barry Sim Hochfield, Glasgow (GB); Anthony Breslin, East Kilbride (GB)

(73) Assignee: ECEBS Limited, South Yorkshire (GB)

( * ) Notice: Subject to any disclaimer, the term of this patent is extended or adjusted under 35 U.S.C. 154(b) by 417 days.

(21) Appl. No.: 10/543,124

(22) PCT Filed: Jan. 26, 2004

(86) PCT No.: PCT/GB2004/000303

§ 371 (c)(1), (2), (4) Date: Mar. 13, 2006

(87) PCT Pub. No.: WO2004/066196

PCT Pub. Date: Aug. 5, 2004

(65) Prior Publication Data

US 2006/0156396 A1    Jul. 13, 2006

(30) Foreign Application Priority Data

Jan. 24, 2003    (GB) .................................. 0301726.6

(51) Int. Cl.
G06F 21/00    (2006.01)
H04L 9/00    (2006.01)

(52) U.S. Cl. ......................................... 726/20; 713/185

(58) Field of Classification Search ............ 365/185.33; 713/160, 161, 169, 170, 182, 184, 185; 726/16–21, 726/26–33; 380/277–47
See application file for complete search history.

(56) References Cited

U.S. PATENT DOCUMENTS

| 4,930,129 | A | * | 5/1990 | Takahira ..................... 714/766 |
| 4,985,921 | A | * | 1/1991 | Schwartz .................... 713/193 |
| 5,442,704 | A |   | 8/1995 | Holtey |
| 5,754,565 | A | * | 5/1998 | Mo et al. .................... 714/769 |
| 5,897,662 | A | * | 4/1999 | Corrigan et al. ............. 711/173 |
| 6,108,236 | A | * | 8/2000 | Barnett .................. 365/185.09 |
| 6,480,935 | B1 |   | 11/2002 | Hemmo |

FOREIGN PATENT DOCUMENTS

| DE | 195 36 206 | A | 4/1996 |
| EP | 0 856 818 | A | 8/1998 |

OTHER PUBLICATIONS

International Search Report of PCT/GB2004/000303.

\* cited by examiner

*Primary Examiner*—Gilberto Barron, Jr.
*Assistant Examiner*—Christopher B Archer
(74) *Attorney, Agent, or Firm*—Stephen A. Bent; Foley & Lardner LLP

(57) ABSTRACT

A smartcard comprises a substrate having a smartcard chip formed on it as well as a secondary memory device, for example, a FLASH ROM, operatively connected to the smartcard chip. The secondary memory device is capable of storing a plurality of pages of data, each having associated with it a unique sequence number, the sequence number being stored separately from the data page so that when the page is to be read, the sequence number retrieved with the page can be compared with the stored sequence number to authenticate the page.

19 Claims, 3 Drawing Sheets

Figure 2

| Page Header | Page Erase Indicator 1 byte | Random String 5 bytes | Page Number 2 bytes | Seq Num 1 byte |
|---|---|---|---|---|
| Page Data | 512 bytes of data (CBC Encrypted_ | | | |
| Page MAC | 8 byte MAC (calculated over previous 520 bytes) | | | |

SMARTCARD WITH PROTECTED MEMORY ACCESS

The present invention relates to an improved smartcard. A smartcard comprises a substrate, often rectangular in shape, which has formed integrally with it an electronic chip capable of storing data and/or programs that interact with a card reader.

Smartcards are increasingly used in identification and authentication systems, but their usefulness has to date been limited by the fact that memory size is restricted by the size of the die used to form the chip. With increasingly sophisticated on-card applications, this restriction on memory size has become an increasing problem.

We have appreciated that attaching a second memory chip such as a FLASH ROM can greatly extend the storage capacity of the card. The problem with this, however, is that, for the smartcard to be useful, the security of the data held on the secondary memory device must be as good as if it was stored internally to the smartcard chip.

A smartcard in accordance with the invention is characterised in that comprises it comprises a secondary memory device on the substrate and operatively connected to the smartcard chip.

Preferably, the secondary memory device is capable of storing a plurality of pages of data, each having associated with it a unique sequence number, the sequence number being stored separately from the data page so that when the page is to be read, the sequence number retrieved with the page can be compared with the stored sequence number to authenticate the page. Each page is encrypted and signed with a page and chip unique key.

An embodiment of a smartcard in accordance with the invention will now be described in detail, by way of example, with reference to the drawings, in which:

FIG. 2 illustrates an external memory ('XMEM') page structure for use with the smartcard of the invention;

Figure 1:
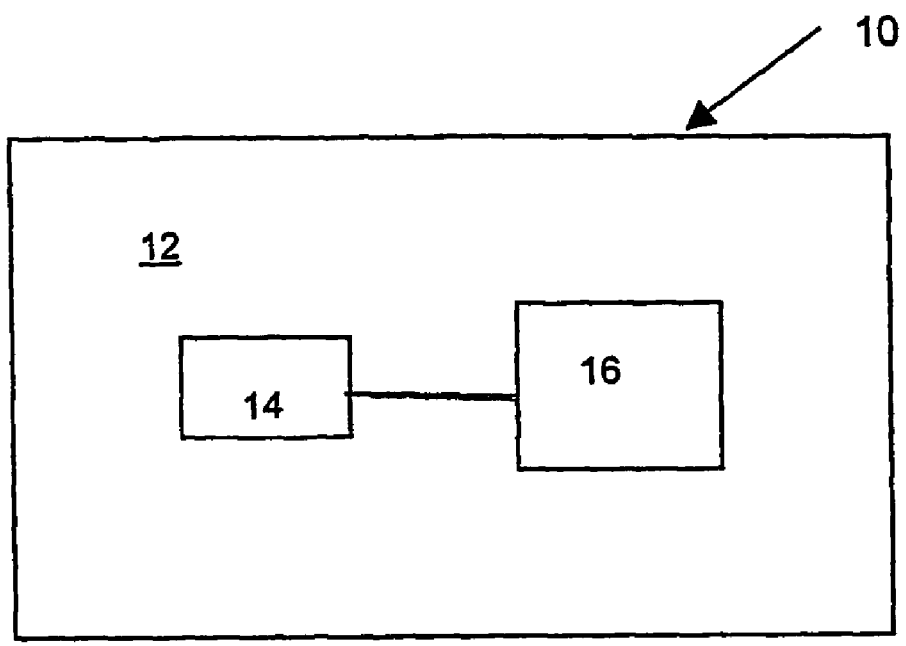
FIG. 1 shows a smartcard having a smartcard chip and a secondary memory device in accordance with the invention.
Figure 3:
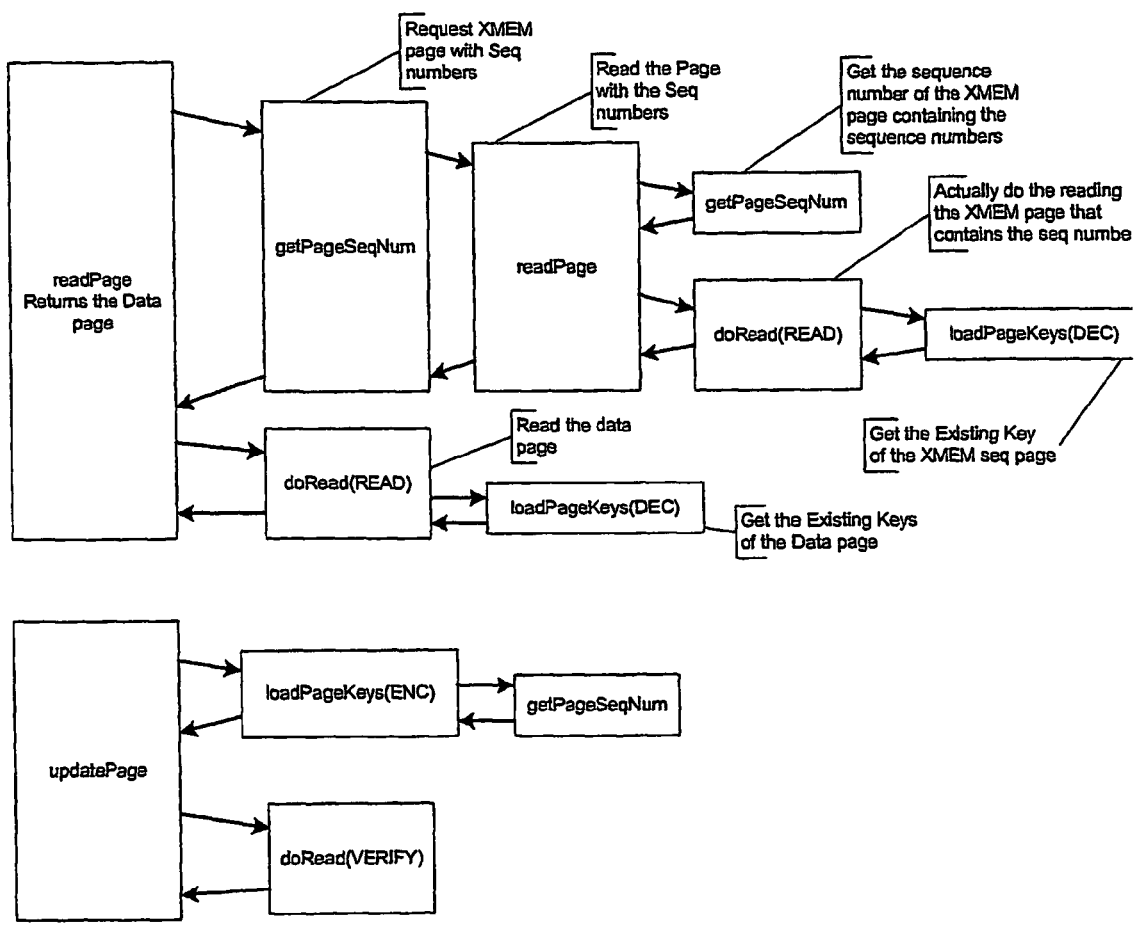

FIG. 3 is a schematic diagram of the XMEM software call tree utilised in the smartcard of the invention As can be seen from FIG. 1, the smartcard 10 of the invention comprises a single substrate 12 resembling a conventional smartcard substrate but provided with two electronic chips, the primary smartcard device 14, which acts as a secure microcontroller and an external memory chip 16 attached to the smartcard microcontroller. The XMEM device 16 may conveniently be a Flash ROM but any other non-volatile or electronic memory device could be used.

At low level, communication functions are needed between the Smartcard operating system and XMEM, for securely communicating and storing data on the XMEM connected to the smartcard. These are called by higher-level function to read and update data in XMEM. The XMEM may be, for example, an ATMEL AT45 DB321 B 4 Mbyte Serial Data Flash. Communication with the XMEM is implemented using an ATMEL AT903232CS serial peripheral interface ('SPI') hardware and one of the input/output lines is used as the chip select. However the principles described would apply to any Smartcard micro-controller with available I/O to interconnect to a serial FLASH device.

In the example, each XMEM page contains 528 bytes. The page structure is shown in FIG. 1. The first 8 bytes (Page Header) contain a byte to indicate that the page is not erased (value not 0xFF), 5 bytes of random data, 2 bytes indicating the page number and a 1 byte sequence number. The Page Header is followed by 512 bytes of data. The trailing 8 bytes contain a copy of the Page Header encrypted using Cipher Block Chaining with the 512 data bytes. The Page Header is not encrypted so as to allow the chip to derive the page keys.

The XMEM drivers we have provided implement the following features to enhance security and reliability.

- The 512 data bytes within a page are Triple DES (Data Encryption Standard) CBC Encrypted. Any changes to the data will change and invalidate the MAC (Message Authentication Cryptogram)
- Each page contains an 8 byte Triple DES MAC.
- Each page is cryptographically embedded with its page number to allow confirmation that the page read is the page requested. The page number is protected from modification by the page MAC.
- The Master DES keys used to derive the page keys are unique to the chip and generated automatically internally the first time the chip is reset. These DES keys cannot be read or updated externally.
- The DES keys to encrypt and sign a page are regenerated on each update to the page from the Master Key, random data, page number and page sequence number. This is an additional security feature to increase the complexity of a known text attack to obtain the keys, as the keys and therefore the MAC change on each update of the page.
- Each Page contains a one byte sequence number that is incremented on each update to the page. The sequence numbers are verified on a page read operation. The sequence number is a random number, changed on each update to the page; therefore the sequence number cannot be derived from the number of total updates to the page. The use of page sequence numbers increases the complexity of the attack by supplying the same page with previous contents. Without a sequence number this would be possible, as the page would have a valid MAC and valid page number.
- All Updates to the XMEM are verified by reading the XMEM after programming.
- The hardware abstraction layer ('HAL') functions will attempt to read or update the page 3 times before exiting.
- If a page is found to be erased it is initialised to a random value on reading. It will not be possible then to erase a page externally to force a page of known erased value to be read internally.

Sequence Numbers

The ATMEL AT45 DB321B contains 8192 pages FLASH memory. As described above, each page of the XMEM has an individual sequence number (1 byte). A copy of the sequence number must be stored elsewhere to compare with the page when read. To stop the copy of the sequence number being modified it must be protected. This can be achieved by storing all of the sequence numbers internally to the smartcard. This may not be suitable in all cases, as it requires 8192 bytes of EEPROM to be reserved for the sequence numbers. This problem is solved by reserving 32 pages of XMEM to each store 256 sequence numbers of the other 8160 pages. These pages are protected as normal, but their sequence numbers are stored in the smartcard EEPROM. Optionally the 32 sequence numbers can be XOR'd to produce a single byte stored in the smartcard EEPROM. This results in a EEPROM usage saving from the 8192 bytes down to 256 bytes.

FIG. 2 below details the call sequence for the External Read and Update page functions which are as follows.

ReadXMEMPage:

void readXMEMPage(word pageNum)

This function will read a page from XMEM. The function will call the function getPageSeqNum to read the expected page sequence number to compare it with the page received.

The function will call the doRead function to perform the actual reading of the pages, decryption and MAC verification.

An error will be returned if the read page sequence number is incorrect updateXMEMPage:

void readCXMEMPage(word pageNum)

This function will update a page in XMEM and requires the page to be previously read to retrieve the existing page sequence number.

This function will call the loadPageKeys functions to derive new keys for the page based on the page number, updated sequence number and random data.

This function will perform the actual updating of the XMEM page using the SPI hardware to send the program command and data to the XMEM chip.

This function will call the doRead function to verify the updated data programmed correctly in the XMEM.

doRead: (internal Function)

void doRead(word pageNum, byte mode)

This function will read a page from XMEM or verify a page in XMEM. It has two modes:
1. It will read the page, decrypt the data, calling the loadPageKeys to derive the page keys and check the MAC and page numbers are correct.
2. It will read the page to verify the encrypted data sent to update the XMEM page was programmed correctly.

loadPageKeys:

void loadPageKeys(byte mode, word pageNum)

This function will load the Keys to encrypt/decrypt a page and generates the key diversificaton string if updating a page using random data, the page number and the incremented page sequence number or when reading it uses the first XMEM page as the diversification string. The diversifications string is encrypted with the chip unique Master XMEM keys to give chip, page and sequence unique keys.

The Keys are loaded into the DES hardware.

getPageSeqNum:

byte readXMEMPage(word pageNum)

This function will return the page sequence number for the page. This function may have is called by the readXMEMPage function to return the page sequence number. It will make a recursive call to the readXMEMPage function to read the XMEM page that contains the original page sequence number requested.

The invention claimed is:

1. A smartcard comprising:
a substrate having a smartcard chip thereon; and
a secondary memory device on said substrate and operatively connected to the smartcard chip,
wherein said secondary memory device is configured to store a plurality of pages of data, each page having associated with it a unique sequence number, the sequence number being stored separately from the page so that when the page is to be read, the sequence number retrieved with the page can be compared with the stored sequence number to authenticate the page.

2. A smartcard according to claim 1 wherein said secondary memory device is a FLASH ROM.

3. A smartcard according to claim 1 wherein the stored sequence number is stored in the smartcard chip.

4. A smartcard according to claim 1 wherein some of the stored sequence numbers are stored in at least one page of the plurality of pages of data stored on the secondary memory device, the sequence number for that at least one page being stored in the smartcard chip.

5. A smartcard according to claim 1 wherein the sequence numbers are XOR'd to produce a digest or HASH which is stored in a smartcard EEPROM.

6. A smartcard according to claim 1 wherein the sequence number for each page of data is set initially at a randomly generated value.

7. A smartcard according to clam 1 wherein each page contains a copy of its page number.

8. A smartcard according to claim 1 wherein the data in each page is encrypted.

9. A smartcard according to claim 1 wherein page data integrity is protected with a cryptographic MAC.

10. A smartcard according to claim 1 wherein the data in each page is encrypted, and page data integrity is protected with a cryptographic MAC, wherein page encryption and cryptographic MAC are performed using a page and chip unique key.

11. A smart card comprising:
a substrate having a smartcard chip thereon; and
a secondary memory device on said substrate and operatively connected to the smartcard chip,
wherein said secondary memory device is configured to store a plurality of pages of data, each page having associated with it a unique sequence number, the sequence number being stored separately from the page so that when the page is to be read, the sequence number retrieved with the page can be compared with the stored sequence number to authenticate the page; and
wherein the sequence number associated with a particular page of data is changed each time the page is modified or updated.

12. A smartcard according to claim 11 wherein the sequence number for each page of data is set initially at a randomly generated value.

13. A smartcard according to claim 11 wherein each page contains a copy of its page number.

14. A smartcard according to claim 11 wherein the date in each page is encrypted.

15. A smartcard according to claim 11 wherein each page data integrity is protected with a cryptographic MAC.

16. A smartcard according to claim 11 wherein the data in each page is encrypted, and page data integrity is protected with a cryptographic MAC, wherein page encryption and cryptographic MAC are performed using a page and chip unique key.

17. A smartcard according to claim 11 wherein said secondary memory device is a FLASH ROM.

18. A smartcard comprising:
a substrate having a smartcard chip thereon; and
a secondary memory device on said substrate and operatively connected to the smartcard chip,
wherein said secondary memory device is capable of storing a plurality of pages of data, each having associated with it a unique sequence number, the sequence number being stored separated from the data page so that when the page is to be read, the sequence number retrieved with the page can be compared with the stored sequence number to authenticate the page; and
wherein the sequence number for each page of data is a randomly generated value.

19. A smartcard according to claim 18 wherein the sequence number associated with a particular page of data is changed to another randomly generated value each time the page is modified or updated.

* * * * *